(12) United States Patent  
Ganesh Kumar (10) Patent No.: US 9,270,190 B2  
(45) Date of Patent: Feb. 23, 2016

(54) PREDICTIVE AND REACTIVE CONTROL OF SECONDARY SIDE SYNCHRONOUS RECTIFIERS IN FORWARD CONVERTERS

(71) Applicant: Linear Technology Corporation, Milpitas, CA (US)

(72) Inventor: Niranjan Ganesh Kumar, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 159 days.

(21) Appl. No.: 14/160,831

(22) Filed: Jan. 22, 2014

(65) Prior Publication Data

US 2015/0207423 A1     Jul. 23, 2015

(51) Int. Cl.
*H02M 3/335* (2006.01)
*H02M 1/00* (2007.01)

(52) U.S. Cl.
CPC ...... *H02M 3/33592* (2013.01); *H02M 3/33553* (2013.01); *H02M 2001/0009* (2013.01); *H02M 2001/0032* (2013.01)

(58) Field of Classification Search
CPC .............. H02M 1/08; H02M 3/33546; H02M 3/33553; H02M 3/33592; H02M 2001/0009; H02M 2001/0032
USPC ....................................... 363/21.05
See application file for complete search history.

(56) References Cited

U.S. PATENT DOCUMENTS 7,206,208 B1 * 4/2007 Hsu ................. H02M 1/38
363/21.06

FOREIGN PATENT DOCUMENTS

| TW | M333715 | 6/2008 |
| TW | 201103246 A | 1/2011 |
| TW | M434372 | 7/2012 |

* cited by examiner

*Primary Examiner* — Jue Zhang
(74) *Attorney, Agent, or Firm* — Patent Law Group LLP; Brian D. Ogonowsky (57) ABSTRACT

A forward converter has a primary side containing a PWM controller for controlling switching of a power switch and has a secondary side coupled to the primary side via a transformer. The secondary side includes a forward transistor and a catch transistor. A secondary side switch controller controls switching of the forward transistor and the catch transistor without communication from the primary side. The secondary side switch controller detects the rising and falling of the voltages at the ends of the secondary winding to control the switching of the forward and catch transistors. A delay locked loop (DLL) is provided in the secondary side switch controller that turns on the catch transistor when the power switch is turned off and turns off the catch transistor at a predetermined time before the power switch is turned on. A separate circuit controls the catch transistor during a discontinuous mode.

17 Claims, 7 Drawing Sheets

PREDICTIVE AND REACTIVE CONTROL OF SECONDARY SIDE SYNCHRONOUS RECTIFIERS IN FORWARD CONVERTERS

FIELD OF THE INVENTION

This invention relates to a method of controlling the secondary side synchronous rectifiers in isolated DC/DC forward converters. In particular, the invention relates to controlling the secondary side rectifiers without explicit communication, over the isolation boundary, from the primary side.

BACKGROUND

Figure 1:
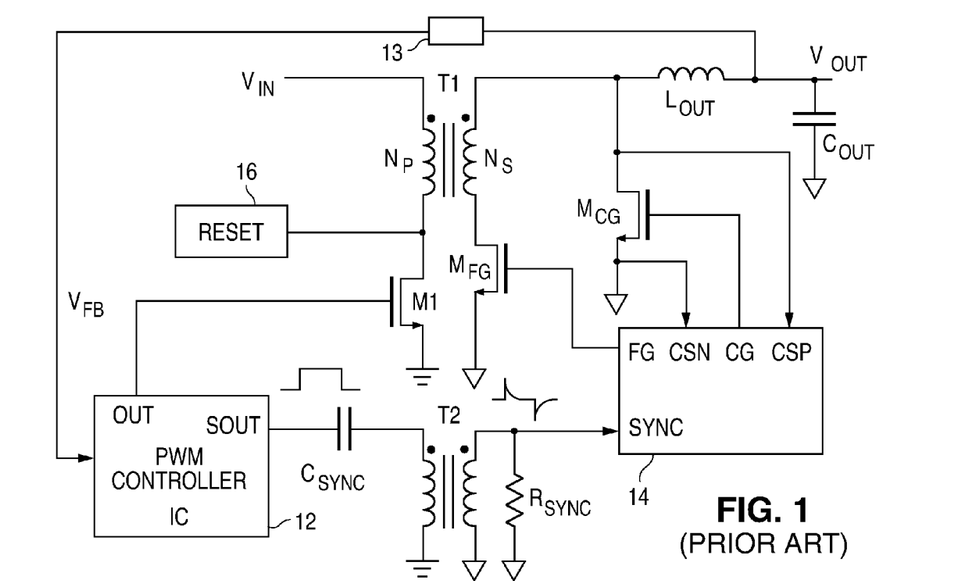
FIG. 1 illustrates a prior art DC/DC forward converter using primary side communication to the secondary side for controlling the secondary side transistors.

FIG. 1 illustrates one type of prior art forward converter. A forward converter is a DC/DC converter that uses a transformer to increase or decrease the output voltage relative to the input voltage (depending on the transformer winding ratio) and provide isolation for the load. In a forward converter, unlike a flyback converter, energy is passed to the output of the forward converter by transformer action during the primary side switch conduction phase.

The maximum output voltage of the forward converter is constrained by the isolation transformer T1 turns ratio Ns/Np, where Ns is the secondary side winding and Np is the primary side winding. Vout equals the PWM duty cycle*Ns/Np*Vin.

Generally, in FIG. 1, a pulse width modulation (PWM) controller IC 12 senses Vout using any type of isolated feedback circuit 13, such as a photodiode-photodetector optical sensor or a transformer to achieve isolation. The PWM controller IC 12 compares the feedback signal to a reference and adjusts the duty cycle of the power MOSFET M1 to match the feedback signal to the reference. More specifically, the PWM controller IC 12 generates fixed frequency pulses, having the required duty cycle, for controlling the power MOSFET M1 (or other type of transistor) and also for controlling the secondary side MOSFETs $M_{FG}$ and $M_{CG}$ in order to keep Vout at a predetermined regulated voltage. $M_{FG}$ refers to a forward gate transistor (also referred to herein as a forward MOSFET), and $M_{CG}$ refers to a catch gate transistor (also referred to herein as a catch MOSFET). A catch transistor is also called a synchronous rectifier and substitutes for a diode. A synchronous rectifier is more efficient than a diode since there is a lower voltage drop, and an output voltage can be lower by using a synchronous rectifier.

When the PWM controller IC 12 issues a pulse via its primary side output pin OUT to turn on the MOSFET M1, it also issues a pulse via its secondary side output pin SOUT to control the secondary side MOSFETs $M_{FG}$ and $M_{CG}$. When MOSFET M1 is on, MOSFET $M_{FG}$ is on and MOSFET $M_{CG}$ is off. When MOSFET M1 is off, MOSFET $M_{FG}$ is off and MOSFET $M_{CG}$ is on. The pulses are precisely timed to ensure MOSFET $M_{CG}$ is off when MOSFET M1 turns on to avoid wasting energy. The control signals from the PWM controller IC 12 to the secondary side need to be isolated from the secondary side via the transformer T2. A secondary side controller IC 14 receives the control signals at its SYNC input and controls the MOSFETs $M_{FG}$ and $M_{CG}$ synchronously with the switching of the MOSFET M1.

When the forward MOSFET $M_{FG}$ is on, a ramping-up current flows through the output inductor Lout, and the output capacitor Cout smooths the ripple to create a DC output Vout. When the MOSFETs M1 and $M_{FG}$ are off and the MOSFET $M_{CG}$ is on, the MOSFET $M_{CG}$ causes a ramping-down current to flow through the inductor Lout.

The current though the MOSFET $M_{CG}$ is monitored by the secondary side controller IC 14 by detecting the voltage across it (CSN and CSP). If the current is about to reverse (CSP approximately equals CSN), the controller IC 14 turns the MOSFET $M_{CG}$ off, so as not to waste power.

When MOSFET M1 is off, a reset circuit 16, controlled by the PWW controller IC 12, resets the primary winding of the transformer T1 to a starting state, such as by temporarily connecting a series capacitor between the primary winding and ground during MOSFET M1's off time.

Figure 2:
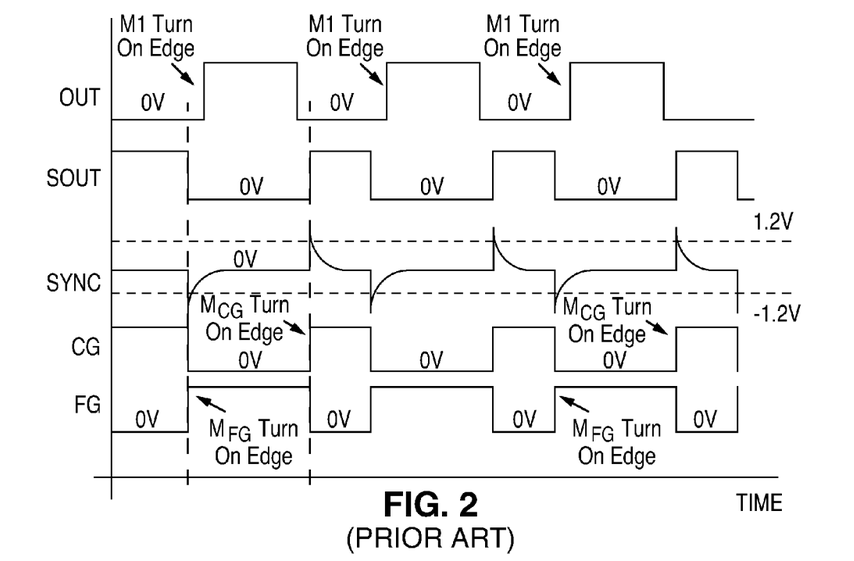
FIG. 2 shows examples of signals generated in the converter of FIG. 1.

FIG. 2 illustrates typical control signals received and generated by the ICs 12 and 14 to generate a regulated Vout by controlling the fixed frequency duty cycle of the MOSFET M1.

One drawback of the prior art converter of FIG. 1 is that the transformer T2 adds cost and size to the converter. It also adds complexity to the system. What is needed is a forward converter that can synchronously control the secondary side MOSFETs (or other types of transistors) without the use of a separate transformer like the transformer T2.

SUMMARY

A forward converter is disclosed that does not use any explicit communication from the primary side to control the forward and catch MOSFETs (or other types of transistors) on the secondary side. All signals detected for controlling the secondary side transistors are obtained from the secondary side. Therefore, no transformer for primary side-to-secondary side communication is needed, significantly reducing the size and cost of the converter compared to the prior art.

The converter senses the voltage between the secondary winding of the isolation transformer and the forward MOSFET $M_{FG}$. This voltage is referred to as the forward switch (FSW) voltage. When the primary side MOSFET M1 turns on, FSW will fall below a threshold, and the sensed fall is used to turn on the forward MOSFET $M_{FG}$ in the secondary side. It is very important that the catch MOSFET $M_{CG}$ never be on at the same time that the MOSFETs M1 and $M_{FG}$ are on in order to achieve maximum efficiency. A delay locked loop (DLL) is used in the secondary side to predict when the MOSFET M1 will turn on for each cycle, since the PWM controller operates at a fixed frequency. The DLL uses the voltage level between the isolation transformer and the output inductor to identify when the MOSFET M1 turns on and off. That voltage is referred to as the catch switch (CSW) voltage, where the CSW voltage has a rising edge when the power MOSFET M1 is turned on. The DLL automatically turns the catch MOSFET $M_{CG'}$ off at a predetermined time, such as 100 ns, before the MOSFET M1 turns on by ensuring the MOSFET $M_{CG'}$ turns off 100 ns before the CSW signal rises. The MOSFET $M_{CG'}$ is turned on at approximately the time that the MOSFET M1 is turned off by detecting the falling of the CSW signal. As seen, the catch MOSFET $M_{CG}$ is controlled solely by secondary side signals to never be on at the same time that the MOSFETs M1 and $M_{FG}$ are on. During the 100 ns off state of the MOSFET $M_{CG}$, any current conducted by the MOSFET $M_{CG}$ is conducted by its body diode.

The above operation is referred to as a predictive scheme, since the circuit predicts when the MOSFET M1 will be turned on and turns off the catch MOSFET $M_{CG}$ 100 ns before the predicted turn on of the MOSFET M1.

The above operation using the DLL is applicable to the converter operating in a continuous mode at medium to high load currents. However, at very light loads, the PWM controller may go into a variable frequency mode, where the primary side MOSFET M1 remains off for a number of duty cycles while the output capacitor supplies the low current to the load until the output voltage droops below a threshold voltage. Further, the catch MOSFET $M_{CG}$, has a minimum on time, such as 250 ns. This minimum on-time may be too long to avoid conducting a reverse current if the load current is low enough, so it is desirable to not turn on the MOSFET $M_{CG}$ during the cycle in such a situation. In either case, at least the catch MOSFET $M_{CG}$ remains off over a number of cycles. This is referred to as a discontinuous mode. In this scenario, the forward converter uses a reactive scheme to determine when to turn off the catch MOSFET $M_{CG}$. When the voltage across the MOSFET $M_{CG}$ is below a lower threshold, indicating a very low current through the MOSFET $M_{CG}$, the MOSFET $M_{CG}$ is turned off to prevent a reverse current flow from the output capacitor. Any rectifying action by the MOSFET $M_{CG}$ will be performed by its body diode when the MOSFET $M_{CG}$ is kept off. Both MOSFETs $M_{CG}$ and $M_{FG}$ are then kept off for an evaluation period. If it is detected over the evaluation period, such as equal to three CSW voltage rising cycle times, that the load current continues to be above a threshold level, then it is determined that the converter should come out of its discontinuous mode, and the predictive scheme, described above, is resumed.

Various other embodiments are described.

BRIEF DESCRIPTION OF THE DRAWINGS

FIG. 5 illustrates a delay locked loop (DLL) circuit used to predict the turn-on of the primary side power MOSFET M1 and turn off the catch MOSFET $M_{CG}$, a predetermined time before the MOSFET M1 is turned on.

Elements that are the same or equivalent are labeled with the same numeral.

DETAILED DESCRIPTION

In the various embodiments of the invention shown in FIGS. 3-12, only the aspects of the converter that are different from the converter of FIG. 1 are described in detail.

Figure 3:
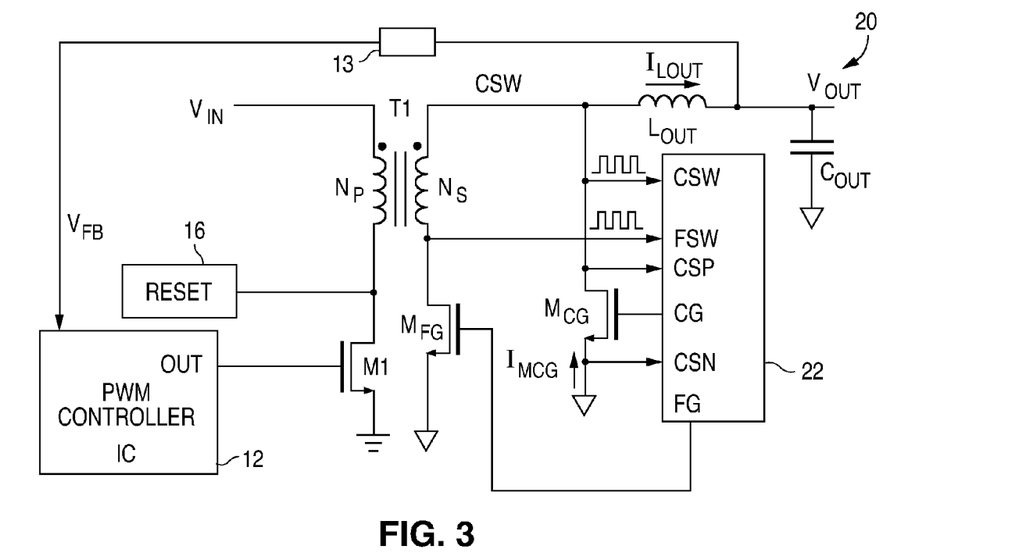
FIG. 3 illustrates a forward converter in accordance with one embodiment of the invention.

FIG. 3 illustrates a forward converter 20 that may have a conventional primary side PWM controller IC 12, isolation transformer T1, power MOSFET M1, reset circuit 16, and Vout feedback circuit 13 as FIG. 1. The PWM controller IC 12 may control the power MOSFET M1 in the same way that the power MOSFET M1 is controlled in FIG. 1 but is not required to issue any control signals for the secondary side MOSFETs, so the transformer T2 in FIG. 1 is not necessary.

In FIG. 3, all the signals used to control the secondary side MOSFETs are generated on the secondary side. A secondary side controller IC 22 detects signals on the secondary side and uses those signals to generate gate control voltages for the MOSFETs $M_{FG}$ and $M_{CG}$ to ensure that the forward MOSFET $M_{FG}$ turns on when the power MOSFET M1 is on, ensure that the forward MOSFET $M_{FG}$ turns off when the MOSFET M1 turns off, ensure that the catch MOSFET $M_{CG}$ is off when the MOSFETs M1 and $M_{FG}$ are on, and ensure that the MOSFET $M_{CG}$ turns on when the MOSFETs M1 and $M_{FG}$ are off, at least during continuous mode operation at medium to high load currents. During very low load currents, the MOSFET $M_{CG}$ may be kept off for an extended period to avoid reverse current conduction.

Figure 4:
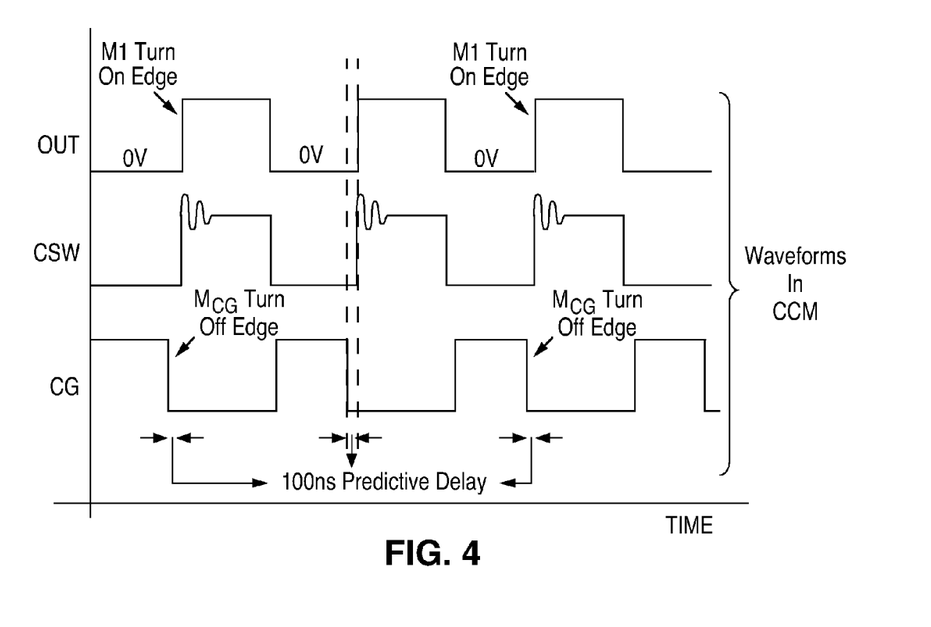
FIG. 4 shows examples of signals generated in the converter of FIG. 3 used in a predictive mode of operation at medium to high load currents.
Figure 5:
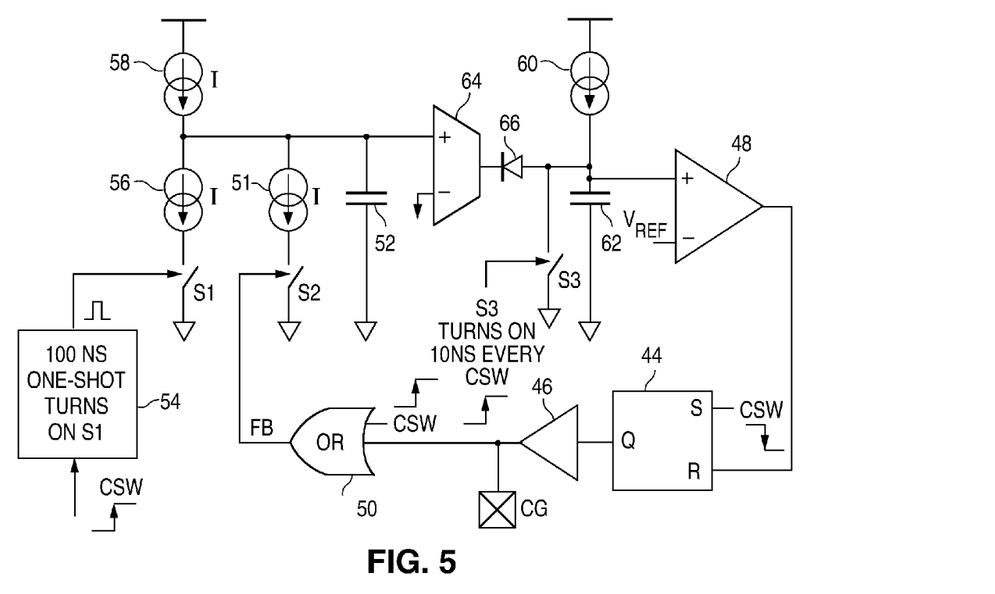
Figures 7, 8:
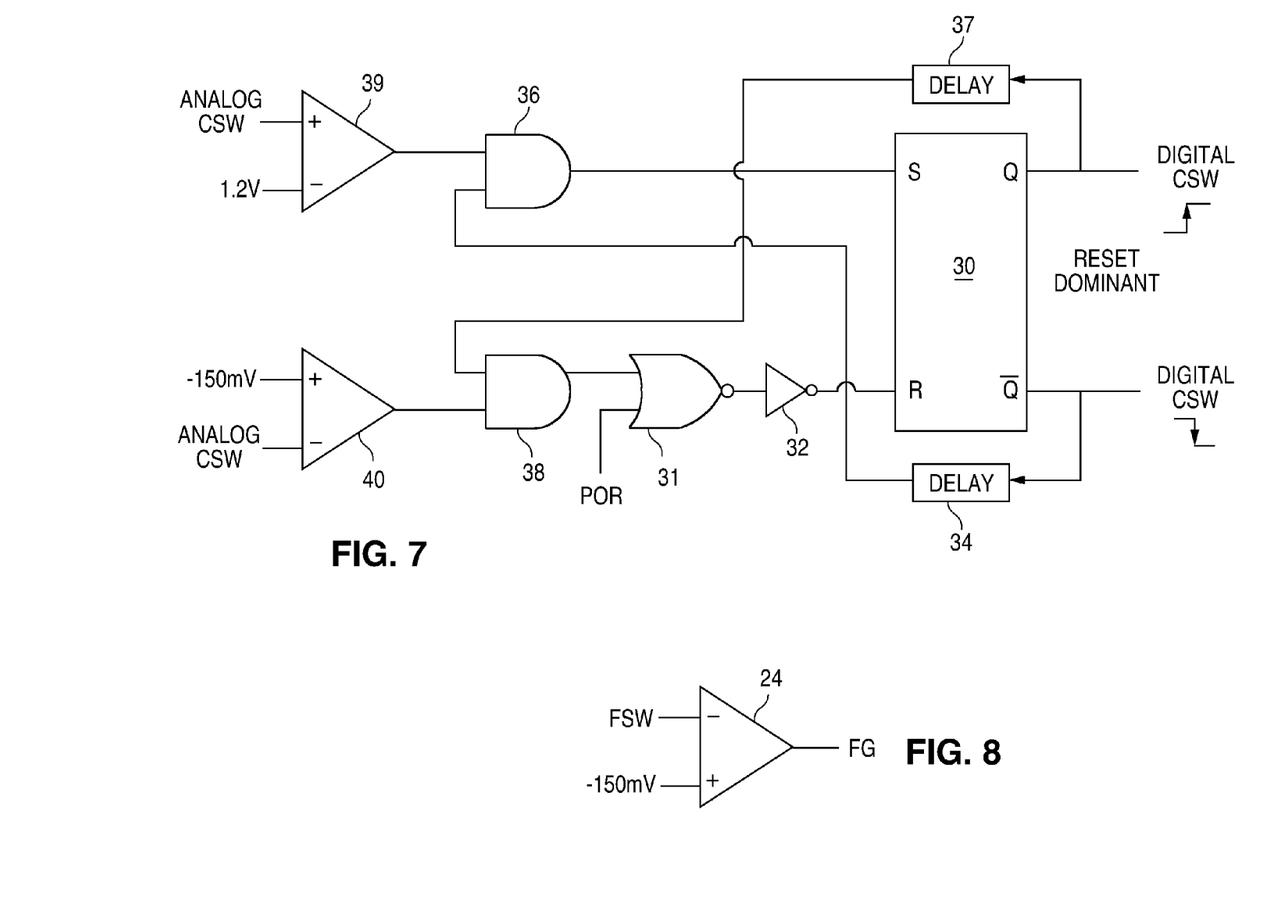
FIG. 7 illustrates a circuit for generating a digital CSW signal from a detected analog CSW signal on the secondary side winding for use in the circuit of FIG. 5.
FIG. 8 illustrates a circuit for generating a forward MOSFET $M_{FG}$ turn-on signal from a detected analog FSW signal on the secondary side winding.

FIG. 4 illustrates certain waveforms generated in the forward converter 20. FIGS. 5 and 7 illustrate circuitry in the controller IC 22 used to control the catch MOSFET $M_{CG}$ to turn on and off, which is the most complex task. In contrast, the circuit in the controller IC 22 for turning the forward MOSFET $M_{FG}$ on and off is fairly direct and shown by FIG. 8.

Regarding controlling the forward MOSFET $M_{FG}$, when the power MOSFET M1 is turned on by the PWM controller IC 12, current flows through the primary side winding Np, and the forward switch voltage FSW (FIG. 3), taken from the bottom terminal of the secondary winding Ns, rapidly falls (the catch MOSFET $M_{CG}$ is off at this time). The comparator 24 in FIG. 8 senses that the analog voltage FSW has dropped below a threshold, which is −0.15 volts in the example. This triggers the comparator 24 to generate a positive forward gate FG voltage at the FG pin of the controller IC 22 for turning on the forward MOSFET $M_{FG}$ generally in sync with the turning on of the power MOSFET M1. Conversely, when the power MOSFET M1 is turned off by the PWM controller IC 12, the FSW voltage will rise above −0.15 volts, and the comparator 24 outputs a low (e.g., ground) FG voltage which turns off the MOSFET $M_{FG}$.

Any comparator described herein may be a hysteresis comparator if false triggering due to ringing or noise is a problem. Further, additional circuitry may be incorporated into the controller IC 22 to ensure the MOSFETs $M_{CG}$ and $M_{FG}$ do not conduct at the same time.

In the circuits of FIGS. 5 and 7, the catch MOSFET $M_{CG}$ is controlled independently from the way that the forward MOSFET $M_{FG}$ is controlled.

The circuit of FIG. 7 detects the analog catch switch CSW voltage at the top of the secondary winding Ns, where the output inductor Lout is coupled to the secondary winding Ns, and generates a binary digital CSW voltage for use in the circuit of FIG. 5. In FIG. 7, the RS flip flop 30 is reset-dominant, meaning that the flip flop 30 will assume a reset latch state when both its set and reset inputs are high.

A power-on-reset (POR) signal is initially an active high. The POR signal is applied to a NOR gate 31, coupled to an inverter 32, where the inverter 32 is coupled to the reset terminal of the flip flop 30. As a result of the POR signal going high, the flip flop 30 is reset, wherein the Q output is low and the Q' (inverted Q) is high. The POR signal then goes low to allow the circuit to react to the changing analog CSW voltage. It will be assumed that the circuit starts with the digital CSW voltage being low.

After some delay time by a delay circuit 34, to avoid the effects of the analog CSW voltage ringing, the high Q' signal is coupled to the upper AND gate 36. The low Q signal is delayed by the delay circuit 37 and propagates to the lower AND gate 38. The circuit is now ready to react to the analog CSW voltage going high (power MOSFET M1 turning on).

The controller IC 22 (FIG. 3) detects the analog CSW voltage at the top of the secondary winding Ns. When the power MOSFET M1 is turned on (by a high gate voltage at the OUT pin of the PWM controller IC 12), the analog CSW voltage rapidly rises, and rings, as shown in FIG. 4. The analog CSW voltage level is compared to upper and lower thresholds using the circuit of FIG. 7. When the CSW voltage exceeds 1.2 volts, in the example (the CSW may exceed 100 volts in some applications), the comparator 39 is triggered and outputs a logic high voltage. The high voltage is applied to the AND gate 36, whose output is connected to the set terminal of the flip flop 30. As a result, the flip flop is set, causing a high Q signal (a high digital CSW voltage at the rising edge of the analog CSW voltage) and a low Q' signal.

After some delay time, the low Q' signal propagates to the upper AND gate 36, and the high Q signal propagates to the lower AND gate 38. The circuit is now ready to react to the analog CSW signal going low (power MOSFET M1 turning off). When the analog CSW signal goes below −150 mV, in the example, the comparator 40 is triggered and the flip flop 30 is reset. This causes the Q signal to be low (a low digital CSW signal) and the Q' signal to be high (a high inverted digital CSW signal).

Accordingly, a high Q output of the flip flop 30 indicates that the analog CSW voltage has gone high, and a high Q' output of the flip flop 30 indicates that the analog CSW voltage has gone low. Other types of debouncing circuits may be used instead of FIG. 7 to avoid the effects of ringing.

The digital CSW voltages indicating whether the analog CSW voltage has gone high (power MOSFET M1 turned on) or low (power MOSFET M1 turned off) are applied to the delay locked loop (DLL) of FIG. 5 to control the CG (catch gate) output of the controller IC 22 to turn the catch MOSFET $M_{CG}$ on or off. In the example, the DLL controls the catch MOSFET $M_{CG}$ to turn off 100 ns before the power MOSFET M1 turns on, and controls the catch MOSFET $M_{CG}$ to turn on upon sensing that the power MOSFET M1 has been turned off. Such detection is independent of the control of the forward MOSFET $M_{FG}$.

The inverted Q' output of the flip flip 30 is coupled to the set pin of the RS flip flop 44 in FIG. 5. Thus, upon the falling edge of the analog CSW voltage (power MOSFET M1 turned off), the flip flop 44 is set and outputs a high signal to a driver 46, which applies a high signal to the CG pin of the controller 22 (FIG. 3) to turn on the catch MOSFET $M_{CG}$.

To turn the catch MOSFET $M_{CG}$ off, the DLL acts as a timing circuit by generating a ramping signal that is applied to the comparator 48. When the ramping signal crosses the threshold reference voltage Vref (e.g., 1.2 volts), the flip flop 44 is reset to cause the CG pin to go low and turn off the catch MOSFET $M_{CG}$.

Figure 6:
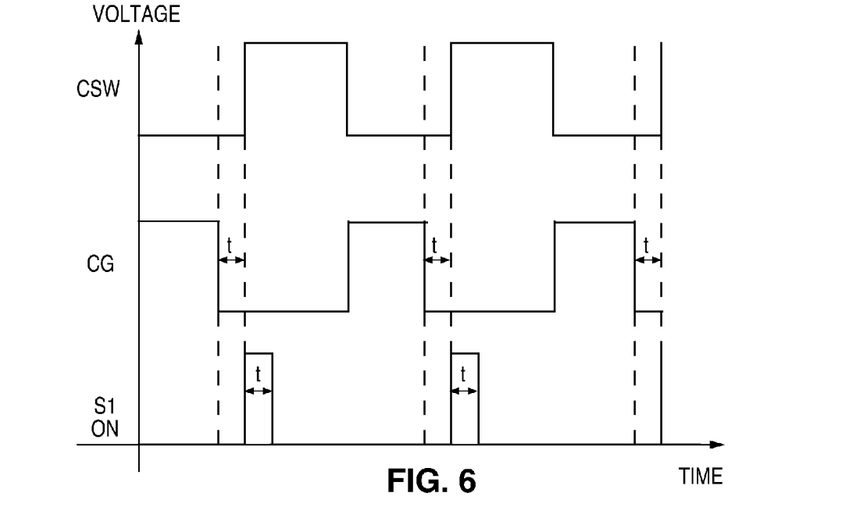
FIG. 6 shows examples of signals generated in the DLL of FIG. 5.

When the digital CSW voltage goes high (Q of flip flop 30 in FIG. 7 goes high), while the CS pin is low, the high CSW voltage is passed by the OR gate 50 to create a high feedback FB signal. This turns on the switch S2 to couple the current source 51 to ground and draw current I from the capacitor 52. The high CSW voltage is also applied to a 100 ns one-shot 54, which applies a 100 ns pulse to the switch S1 to couple the current source 56, also generating a current I, to ground for 100 ns. This is shown in the waveforms of FIG. 6. The 100 ns was selected as a safe delay for turning off the catch MOSFET $M_{CG}$ prior to the predicted turn on of the power MOSFET M1. Other delay times can be used. The switch S2 is also turned on when the CG pin is high (the catch MOSFET $M_{CG}$ is on), due to the operation of the OR gate 50.

A high side current source 58 also supplies a current I, which is sunk by either or both the current source 51 and the current source 56, depending on the state of the switches S1 and S2.

A high side current source 60 supplies current to a capacitor 62 connected to ground. The other terminal of the capacitor 62 is connected to the non-inverting input of the comparator 48. If the capacitor 62 voltage exceeds 1.2 volts, the comparator 48 trips to reset the flip flop 44 to turn off the catch MOSFET $M_{CG}$.

At the beginning of a switching cycle, when the digital CSW voltage goes high, the switch S3 is briefly turned on (e.g., for 10 ns) to discharge the capacitor 62 to ground. The capacitor 62 then begins to ramp up. The capacitor 62 value and current from the current source 60 are selected for the desired switching frequency, such as 800 kHz. Therefore, if the capacitor 62 were to be charged with the full amount of current from the current source 60, the voltage ramp signal on capacitor 62 would repeat at a frequency of 800 kHz. As will be described, the left side of the circuit steals current from the capacitor 62 to cause the comparator 48 to trigger 100 ns prior to the CSW voltage going high.

The voltage at the capacitor 52 is applied to an input of a transconductance (gm) amplifier 64, which draws an increased current at its output with an increased voltage at its input. A diode 66 connects the capacitor 62 to the amplifier 64. An increased voltage on capacitor 52 therefore increases the current drawn from the capacitor 62 through the diode 66 to slow the ramping of the capacitor 62. The ramping and discharging of the capacitor 62 is at the same frequency as the switching of the power MOSFET M1, but, as described below, the reset triggering of the flip flop 44 occurs 100 ns prior to the digital CSW voltage rising again.

A single period of the digital CSW voltage is one rising edge to the next rising edge. This period equals the time that the digital CSW voltage is high, plus the time that the CG pin is high, plus the time that the switch S1 is on (100 ns). The total current drawn by the switches S1 and S2 being on per cycle must equal the current supplied by the current source 58 during the cycle for the loop to achieve steady-state. The on-time of the switch S1 per cycle is fixed, and the length of time that the switch S2 is on during the cycle varies the voltage of the capacitor 52 to stabilize the loop. The loop will operate at a steady state for a constant load current, and the switch S2 will be automatically controlled by the loop to be on so that the time that the CSW voltage is high, plus the time that the CG pin is high, plus the time that the switch S1 is on equals one cycle time. Therefore, the CG pin high state is reduced by 100 ns each cycle, as shown in the waveforms of FIG. 6, by the flip flop 44 being reset 100 ns prior to the CSW voltage going high. Therefore, the MOSFET $M_{CG}$ is prevented from being on at the time that the power MOSFET M1 is turned on.

Note that a high frequency reset can occur before the next set signal. In such a case, the MOSFET $M_{CG}$ will not turn on.

Other types of delay lock loops (DLLs) may also be used to ensure the catch MOSFET $M_{CG}$ turns off sometime before the MOSFET M1 turns on, based on the timing of the CSW signal.

Figure 11:
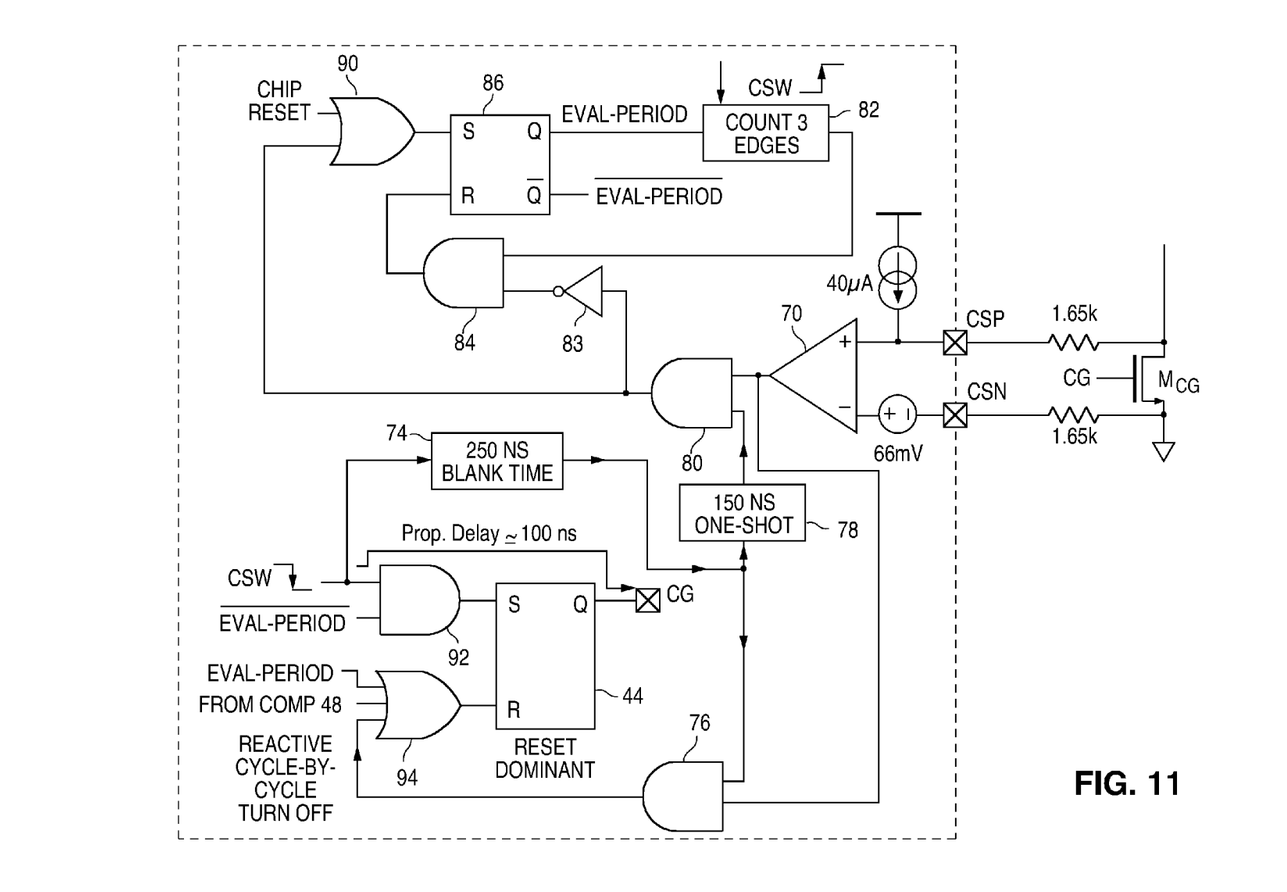
FIG. 11 illustrates a circuit used in the reactive mode for controlling the catch MOSFET $M_{CG}$.

The above description of operation applies during continuous conduction modes (CCM) of operation where the transistors are all turned on and off each cycle during medium to high current loads. For very low load currents, the minimum duty cycle of the power MOSFET M1 may be too high to achieve regulation. In such a case, the switching should be suspended for one or more cycles, creating a discontinuous conduction mode (DCM) of operation. Further, for very low load currents, the MOSFET $M_{CG}$, which has a minimum on-time, may be turned off to avoid reverse currents through it, also resulting in a discontinuous mode. The circuit of FIG. 11 is used in the discontinuous conduction mode to control the turning on and off of the catch MOSFET $M_{CG}$.

Figure 9:
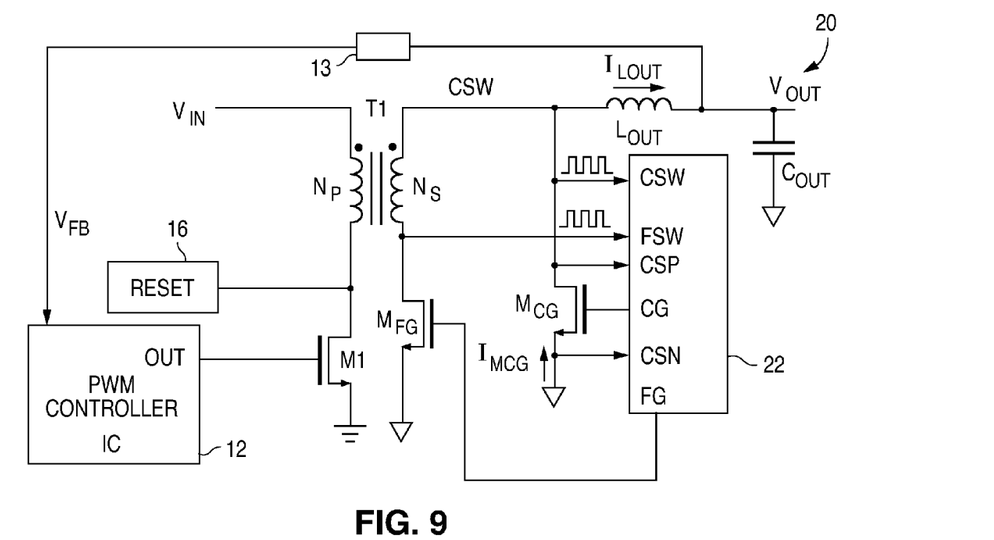
FIG. 9 is a duplicate of the forward converter circuit of FIG. 3 to more easily understand the waveforms of FIG. 10.
Figure 10:
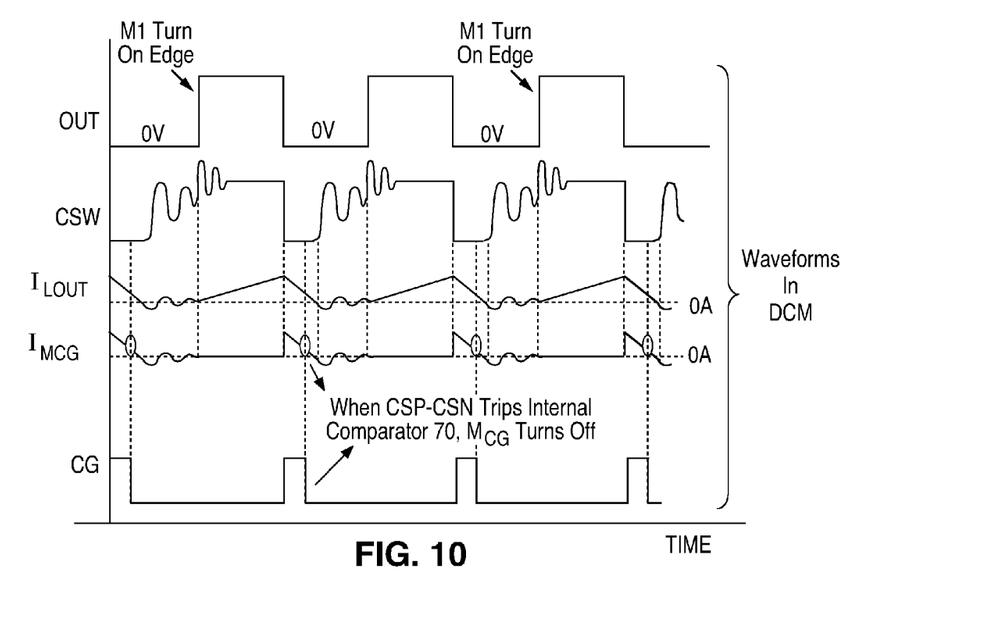
FIG. 10 shows examples of signals generated in the converter of FIG. 9 used in a reactive mode of operation at very low load currents.

FIG. 9 is identical to FIG. 3 and is provided for convenience to better understand the waveforms shown in FIG. 10 occurring during the discontinuous mode, when the MOSFET $M_{CG}$ is turned off prematurely to prevent reverse current flow. The switching scheme of the catch MOSFET $M_{CG}$ is a reactive scheme.

The voltage across the catch MOSFET $M_{CG}$ terminals (CSP and CSN) is detected by the controller IC 22. If the load current is low enough, the voltage will go below a threshold, such as 66 mV in the example, and a comparator 70 is tripped, signaling that the catch MOSFET $M_{CG}$ should be turned off to avoid conducting a reverse current.

Figure 12A:
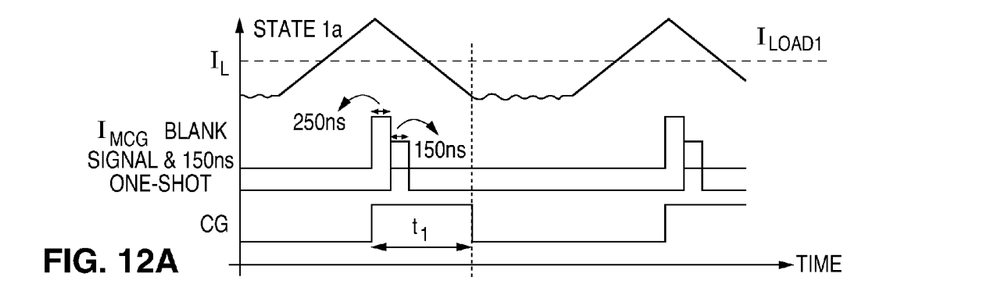
FIGS. 12A-12D illustrate waveforms for various scenarios which determine whether the converter is to be operated in the predictive mode or the reactive mode.
Figure 12B:
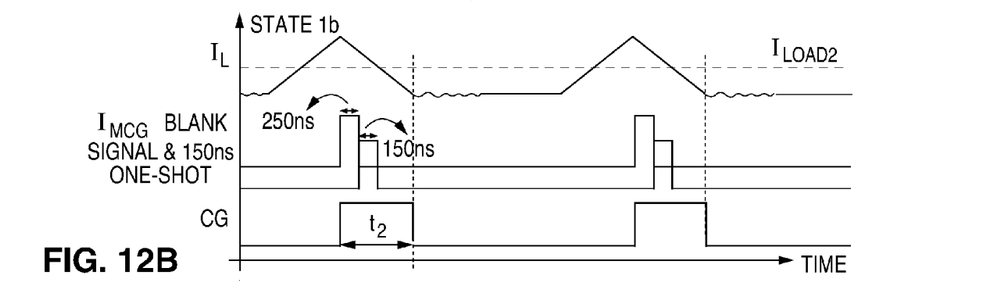

FIGS. 12A-12D show waveforms during discontinuous conduction mode operation, split into three distinct states. In States 1*a* and 1*b*, shown in FIGS. 12A and 12B, the MOSFET $M_{CG}$ turns off cycle by cycle at the specific time when the current through it drops to near zero, as determined by the comparator 70. FIGS. 12A and 12B show the ramping current $I_L$ through the output inductor Lout, and show the average current, which is the load current. The ramp going down corresponds to the power MOSFET M1 being off. The CG gate voltage for controlling the MOSFET $M_{CG}$ is also shown, which begins when MOSFET M1 turns off and ends when the comparator 70 trips at approximately zero current. FIG. 12A shows the operation at a first load current level, and FIG. 12B shows the operation at a lighter load current level, but insufficient to enter an evaluation phase, discussed below.

The MOSFET $M_{CG}$ has a minimum on-time of 250 ns. The circuit of FIG. 11 provides a 250 ns blank time delay circuit 74 that prevents the flip flop 44 (the same flip flop 44 shown in FIG. 5) from resetting the CG pin within 250 ns after the CSW voltage falls, irrespective of the state of the comparator 70. The delay circuit 74 begins the delay upon the digital CSW signal going low (which corresponds to the MOSFET $M_{CG}$ turning on) and provides an input to the AND gate 76. The output of the comparator 70 is also provided to the AND gate 76.

After the 250 ns delay, a 150 ns one-shot 78 is triggered. If the comparator 70 has detected the zero current while the one-shot 78 output is high (indicating a very low load current), the circuit goes into an evaluation phase, since it is apparent that the minimum on-time of the MOSFET $M_{CG}$ is too long for the low load current operation. This operation is shown by the waveforms of FIGS. 12C (State 2) and 12D (State 3).

Figure 12C:
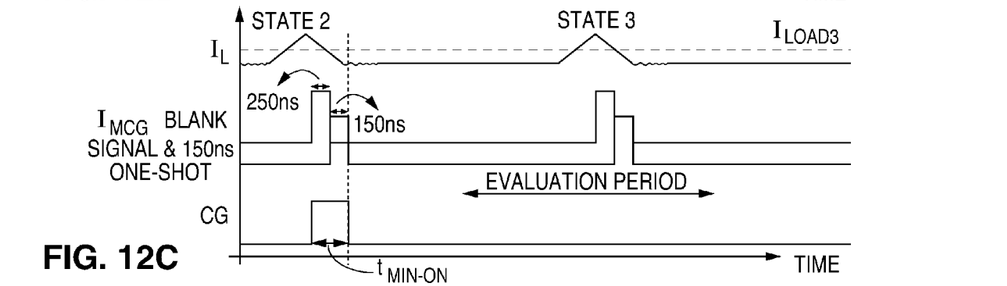
Figure 12D:
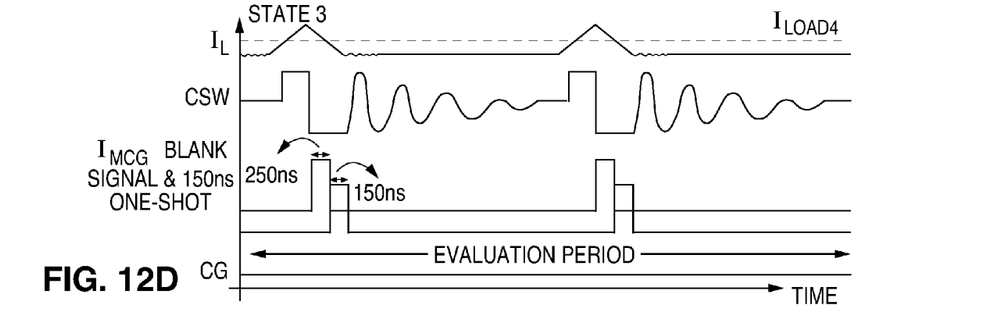

If the comparator 70 is tripped during the 150 ns period, as shown in FIG. 12C, and if the MOSFET $M_{CG}$ was on, then the MOSFET $M_{CG}$ is forced off, and the evaluation period is started, as shown in FIG. 12D. The evaluation circuitry is shown in the top portion of FIG. 11, coupled to the output of the AND gate 80.

During the evaluation period, shown in FIG. 12D, the circuit of FIG. 11 keeps detecting whether the comparator 70 trips during the 150 ns evaluation period on a cycle by cycle basis without the MOSFET $M_{CG}$ ever turning on. The MOSFET $M_{CG}$ body diode performs the rectification during this time.

If the load current increases, the duty cycle of the power MOSFET M1 will go up, under the control of the PWM controller IC 12, and the comparator 70 will not trip on a cycle by cycle basis. If the evaluation circuit detects three consecutive CSW rising edges without a trip of the comparator 70, using the counter 82, then the MOSFET $M_{CG}$ is allowed to turn on again each cycle. Other count values may be used, such as any count greater than two.

The evaluation circuitry comprises the inverter 83, the AND gate 84, the set-dominant flip flop 86, the counter 82 for counting the three consecutive CSW rising edges, and the OR gate 90 that receives the output of the AND gate 80 and a chip reset signal. The flip flop 86, counter 82, and AND gate 84 are connected in a loop so as to only generate an eval-period-not signal if the comparator 70 has not tripped within the 150 ns period after three cycles.

The eval-period-not signal is applied to an AND gate 92 along with the digital CSW falling edge signal, and the output of the AND gate 92 is applied to the set input of the flip flop 44.

The eval-period signal from the flip flop 86, the output signal from the comparator 48 (FIG. 5) and the output of the AND gate 76 are coupled to an OR gate 94. The output of the OR gate 94 is coupled to the reset input of the flip flop 44.

FIG. 5, which shows the predictive portion of the circuitry in the IC 22, does not show the overlapping reactive portion of the circuitry of FIG. 11 for simplicity.

Accordingly, a predictive technique, incorporating a delay locked loop (DLL), has been shown for turning on and off the catch switch in a forward converter without any communication from the primary side. Additionally, for discontinuous conduction mode operation, a reactive technique has been disclosed for turning on and off the catch switch without any reverse current flowing through the catch switch, where the catch switch has a minimum on-time.

The embodiments have been described using a separate secondary side controller IC 22 that senses the various signals in the secondary side of an otherwise conventional forward converter and controls the switching of the forward and catch transistors. Such an IC 22 can easily be incorporated into existing designs, and the transformer previously used to convey switching signals from the primary side to the secondary side can be deleted, saving cost, size, and complexity. With respect to FIG. 1, the IC 22 directly replaces the prior art controller 14 and the transformer T2. The IC 22 may be instead formed using discrete components.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:
1. A forward converter comprising:
   a primary side containing a pulse width modulation (PWM) controller for controlling switching of a power switch at a duty cycle to achieve a regulated output voltage of the converter;
   a transformer having a primary winding, connected to the power switch, and a secondary winding;
   a secondary side coupled to the primary side via the transformer, the secondary side including a forward transistor and a catch transistor;

the secondary side including a secondary side switch controller that controls switching of the forward transistor and the catch transistor without communication from the primary side, the secondary side switch controller comprising:
  a first circuit coupled to a first end of the secondary winding and detecting rising and falling edges of a first voltage at the first end of the secondary winding, the rising and falling edges corresponding to the turning on and turning off of the power switch, the first circuit generating a first digital signal upon a rising edge of the first voltage and generating a second digital signal upon a falling edge of the first voltage;
  a second circuit receiving the first digital signal and the second digital signal, the second circuit turning on the catch transistor upon detecting the second digital signal, the second circuit turning off the catch transistor a predetermined period of time prior to detecting the first digital signal for each cycle such that the catch transistor is turned off prior to the power switch being turned on; and
  a third circuit coupled to a second end of the secondary winding and detecting at least a falling edge of a second voltage at the second end of the secondary winding, an output of the third circuit being coupled to the forward transistor for turning on the forward transistor upon detection of the falling edge of the second voltage.

2. The converter of claim 1 wherein the second circuit comprises a delay locked loop (DLL) receiving the first digital signal and the second digital signal, the DLL having a frequency equal to a switching frequency of the power switch and providing a delay time equal to a desired time that the catch transistor turns off before the power switch turns on, the DLL having an output coupled to control the catch transistor to turn on and off.

3. The converter of claim 2 wherein the DLL comprises:
  a reset-set flip flop having an output that controls turning on and off of the catch transistor, a set terminal of the flip flop receiving the second digital signal;
  a comparator having an output coupled to a reset terminal of the flip flop;
  a ramp generator, generating ramping voltage, connected to one input of the comparator, a second input of the comparator connected to a threshold voltage, wherein when a voltage level of the ramp generator exceeds the threshold voltage, the flip flop is triggered to reset its output to turn off the catch transistor;
  a reset circuit connected to the ramp generator for restarting the ramp generator at an initial level at the beginning of each switching cycle; and
  a controllable current generator coupled to the ramp generator for changing a rate of rise of the ramping voltage based on the delay time,
  wherein triggering of the comparator to turn off the catch transistor occurs at a time prior to a time, equal to the delay time, that the first digital signal is generated.

4. The converter of claim 3 wherein the controllable current generator comprises:
  a transconductance amplifier having an output coupled to the ramp generator for changing a rate of rise of the ramping voltage based on the delay time;
  a high-side first current source, generating a first current, coupled to a first input of the transconductance amplifier;
  a low-side second current source, also generating the first current, coupled to the first input of the transconductance amplifier;
  a low-side third current source, also generating the first current, coupled to the first input of the transconductance amplifier;
  a first switch selectively coupling the second current source to ground for the delay time upon detecting the first digital signal;
  a second switch selectively coupling the third current source to ground for a period approximately equal to a time of the switching cycle minus the delay time; and
  a capacitor coupled to the first input of the transconductance amplifier, wherein the switching duration of the second switch is controlled by the DLL such that a voltage applied to the first input of the transconductance amplifier controls the rate of rise of the ramping voltage based on the delay time to cause the catch transistor to turn off at a time prior to a time, equal to the delay time, that the first digital signal is generated.

5. The converter of claim 1 wherein the forward transistor and the catch transistor are MOSFETs.

6. A forward converter comprising:
  a primary side containing a pulse width modulation (PWM) controller for controlling switching of a power switch at a duty cycle to achieve a regulated output voltage of the converter;
  a transformer having a primary winding, connected to the power switch, and a secondary winding;
  a secondary side coupled to the primary side via the transformer, the secondary side including a forward transistor and a catch transistor;
  the secondary side including a secondary side switch controller that controls switching of the forward transistor and the catch transistor without communication from the primary side, the secondary side switch controller comprising:
    a first circuit coupled to a first end of the secondary winding and detecting rising and falling edges of a first voltage at the first end of the secondary winding, the rising and falling edges corresponding to the turning on and turning off of the power switch, the first circuit generating a first digital signal upon a rising edge of the first voltage and generating a second digital signal upon a falling edge of the first voltage;
    a second circuit receiving the first digital signal and the second digital signal, the second circuit turning on the catch transistor upon detecting the second digital signal, the second circuit turning off the catch transistor a predetermined period of time prior to detecting the first digital signal for each cycle such that the catch transistor is turned off prior to the power switch being turned on,
    wherein the second circuit functions to turn on and off the catch transistor during a continuous conduction mode of the converter;
    a third circuit for controlling the catch transistor during a discontinuous conduction mode, the third circuit comprising:
      a comparator for detecting a voltage across the catch transistor to identify a low load current condition, wherein the comparator triggers within a first period subsequent to a rising edge of the second digital signal during the low load condition;
      a counter configured to count a certain number of rising edges of the first digital signal during an evaluation period; and logic circuitry coupled to the comparator and the counter, the logic circuit being configured for keeping the catch transistor off for one or more cycles if it is determined that the comparator is triggered within the first period, evidencing the low load current condition, and wherein the logic circuit is further configured to allow the catch transistor to be turned on if the comparator does not trigger within the first period over a predetermined number of rising edges of the first digital signal during the evaluation period.

7. The converter of claim 6 wherein the first period is set by a one-shot circuit.

8. The converter of claim 6 wherein the certain number of rising edges is two or more.

9. A secondary side switch controller for controlling secondary side transistors in a forward converter without any communication from a primary side of the converter, the secondary side transistors comprising a forward transistor and a catch transistor, the forward converter comprising a transformer having a primary winding, a secondary winding, and a power switch coupled to the primary winding, the controller comprising:
 a first output terminal for outputting a first control signal for the forward transistor;
 a second output terminal for outputting a second control signal for the catch transistor;
 a first input terminal for coupling to a first end of the secondary winding;
 a first circuit coupled to the first input terminal configured for detecting rising and falling edges of a first voltage at the first end of the secondary winding, the rising and falling edges corresponding to the turning on and turning off of the power switch, the first circuit generating a first digital signal upon a rising edge of the first voltage and generating a second digital signal upon a falling edge of the first voltage;
 a second circuit receiving the first digital signal and the second digital signal, the second circuit turning on the catch transistor upon detecting the second digital signal, the second circuit turning off the catch transistor a predetermined period of time prior to detecting the first digital signal for each cycle such that the catch transistor is turned off prior to the power switch being turned on;
 a second input terminal for coupling to a second end of the secondary winding; and
 a third circuit coupled to the second input terminal configured for detecting at least a falling edge of a second voltage at the second end of the secondary winding, an output of the third circuit being coupled to the first output terminal for turning on the forward transistor upon detection of the falling edge of the second voltage.

10. The controller of claim 9 wherein the second circuit comprises a delay locked loop (DLL) receiving the first digital signal and the second digital signal, the DLL having a frequency equal to a switching frequency of the power switch and providing a delay time equal to a desired time that the catch transistor turns off before the power switch turns on, the DLL having an output coupled to control the catch transistor to turn on and off.

11. The controller of claim 10 wherein the DLL comprises:
 a reset-set flip flop having an output that controls turning on and off of the catch transistor, a set terminal of the flip flop receiving the second digital signal;
 a comparator having an output coupled to a reset terminal of the flip flop;
 a ramp generator, generating ramping voltage, connected to one input of the comparator, a second input of the comparator connected to a threshold voltage, wherein when a voltage level of the ramp generator exceeds the threshold voltage, the flip flop is triggered to reset its output to turn off the catch transistor;
 a reset circuit connected to the ramp generator for restarting the ramp generator at an initial level at the beginning of each switching cycle; and
 a controllable current generator coupled to the ramp generator for changing a rate of rise of the ramping voltage based on the delay time,
 wherein triggering of the comparator to turn off the catch transistor occurs at a time prior to a time, equal to the delay time, that the first digital signal is generated.

12. The controller of claim 11 wherein the controllable current generator comprises:
 a transconductance amplifier having an output coupled to the ramp generator for changing a rate of rise of the ramping voltage based on the delay time;
 a high-side first current source, generating a first current, coupled to a first input of the transconductance amplifier;
 a low-side second current source, also generating the first current, coupled to the first input of the transconductance amplifier;
 a low-side third current source, also generating the first current, coupled to the first input of the transconductance amplifier;
 a first switch selectively coupling the second current source to ground for the delay time upon detecting the first digital signal;
 a second switch selectively coupling the third current source to ground for a period approximately equal to a time of the switching cycle minus the delay time; and
 a capacitor coupled to the first input of the transconductance amplifier, wherein the switching duration of the second switch is controlled by the DLL such that a voltage applied to the first input of the transconductance amplifier controls the rate of rise of the ramping voltage based on the delay time to cause the catch transistor to turn off at a time prior to a time, equal to the delay time, that the first digital signal is generated.

13. The controller of claim 9 wherein the forward transistor and the catch transistor are MOSFETs.

14. The controller of claim 9 wherein the controller is a packaged integrated circuit.

15. A secondary side switch controller for controlling secondary side transistors in a forward converter without any communication from a primary side of the converter, the secondary side transistors comprising a forward transistor and a catch transistor, the forward converter comprising a transformer having a primary winding, a secondary winding, and a power switch coupled to the primary winding, the controller comprising:
 a first output terminal for outputting a first control signal for the forward transistor;
 a second output terminal for outputting a second control signal for the catch transistor;
 a first input terminal for coupling to a first end of the secondary winding;
 a first circuit coupled to the first input terminal configured for detecting rising and falling edges of a first voltage at the first end of the secondary winding, the rising and falling edges corresponding to the turning on and turning off of the power switch, the first circuit generating a first digital signal upon a rising edge of the first voltage and generating a second digital signal upon a falling edge of the first voltage;

a second circuit receiving the first digital signal and the second digital signal, the second circuit turning on the catch transistor upon detecting the second digital signal, the second circuit turning off the catch transistor a predetermined period of time prior to detecting the first digital signal for each cycle such that the catch transistor is turned off prior to the power switch being turned on, wherein the second circuit functions to turn on and off the catch transistor during a continuous conduction mode of the converter;

a third circuit for controlling the catch transistor during a discontinuous conduction mode, the third circuit comprising:

a comparator for detecting a voltage across the catch transistor to identify a low load current condition, wherein the comparator triggers within a first period subsequent to a rising edge of the second digital signal during the low load condition;

a counter configured to count a certain number of rising edges of the first digital signal during an evaluation period; and logic circuitry coupled to the comparator and the counter, the logic circuit being configured for keeping the catch transistor off for one or more cycles if it is determined that the comparator is triggered within the first period, evidencing the low load current condition, and wherein the logic circuit is further configured to allow the catch transistor to be turned on if the comparator does not trigger within the first period over a predetermined number of rising edges of the first digital signal during the evaluation period.

16. The controller of claim 15 wherein the first period is set by a one-shot circuit.

17. The controller of claim 15 wherein the certain number of rising edges is two or more.

* * * * *